(12) United States Patent
Knoll et al.

(10) Patent No.: US 12,473,083 B2
(45) Date of Patent: *Nov. 18, 2025

(54) ELECTRIC TILTROTOR AIRCRAFT WITH TILTING COAXIAL MOTORS AND GEARBOX

(71) Applicant: Textron Innovations Inc., Providence, RI (US)

(72) Inventors: Jonathan Andrew Knoll, Burleson, TX (US); George Matthew Thompson, Lewisville, TX (US); Charles Hubert Speller, Flower Mound, TX (US); Grant Michael Beall, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 107 days.

This patent is subject to a terminal disclaimer.

(21) Appl. No.: 18/480,338

(22) Filed: Oct. 3, 2023

(65) Prior Publication Data

US 2024/0025542 A1 Jan. 25, 2024

Related U.S. Application Data

(63) Continuation of application No. 17/148,307, filed on Jan. 13, 2021, now Pat. No. 11,814,163.

(51) Int. Cl.
*B64C 27/12* (2006.01)
*B64C 29/00* (2006.01)
(Continued)

(52) U.S. Cl.
CPC .......... *B64C 27/12* (2013.01); *B64C 29/0033* (2013.01); *B64D 27/34* (2024.01);
(Continued)

(58) Field of Classification Search
CPC .... B64C 29/0033; B64D 27/24; B64D 29/02; H02K 7/108; H02K 7/116; F16D 41/00
(Continued)

(56) References Cited

U.S. PATENT DOCUMENTS 3,797,783 A 3/1974 Kisovec
6,719,244 B1 4/2004 Gress
(Continued)

FOREIGN PATENT DOCUMENTS

DE 112015003310 T5 3/2017
EP 0261953 B1 4/1992
(Continued)

*Primary Examiner* — Brady W Frazier
(74) *Attorney, Agent, or Firm* — Akona IP PC (57) ABSTRACT

A rotor system for an aircraft includes an open rotor assembly comprising a plurality of rotor blades connected to a rotor mast via a yoke, wherein the rotor assembly is tiltable between a first position corresponding to an airplane mode and a second position corresponding to a helicopter mode; and a drive system for providing rotational energy to the open rotor assembly via the rotor mast, the drive system comprising at least one electric motor for providing rotational energy to a drive shaft and a gearbox connected to the drive shaft for receiving rotational energy from the at least one electric motor via the drive shaft and providing rotational energy to the rotor mast via a rotor shaft; wherein the drive system is rotatable relative to the wing about a tilt axis and the rotor shaft is coaxial with the drive shaft.

16 Claims, 8 Drawing Sheets

(51) Int. Cl.
    *B64D 27/34*     (2024.01)
    *B64D 29/02*     (2006.01)
    *B64D 35/021*     (2024.01)
    *B64D 35/04*     (2006.01)
    *H02K 7/108*     (2006.01)
    *H02K 7/116*     (2006.01)
    *F16D 41/00*     (2006.01)

(52) U.S. Cl.
    CPC ........... *B64D 29/02* (2013.01); *B64D 35/021* (2024.01); *B64D 35/04* (2013.01); *H02K 7/108* (2013.01); *H02K 7/116* (2013.01); *F16D 41/00* (2013.01)

(58) Field of Classification Search
    USPC ........................................................ 244/7 A
    See application file for complete search history.

(56) References Cited

U.S. PATENT DOCUMENTS

| | | |
|---|---|---|
| 8,469,306 B2 | 6/2013 | Kuhn, Jr. et al. |
| 9,156,545 B1 | 10/2015 | Fenny et al. |
| 9,823,022 B2 | 11/2017 | Rollins et al. |
| 2002/0079763 A1 | 6/2002 | Fleshman et al. |
| 2006/0037743 A1 | 2/2006 | Head |
| 2007/0273225 A1 | 11/2007 | Head |
| 2011/0024555 A1 | 2/2011 | Kuhn, Jr. et al. |
| 2011/0084561 A1 | 4/2011 | Swales et al. |
| 2011/0177748 A1 | 7/2011 | Luo |
| 2012/0282103 A1 | 11/2012 | Muren |
| 2014/0151495 A1 | 6/2014 | Kuhn, Jr. |
| 2014/0263855 A1 | 9/2014 | Ross et al. |
| 2014/0299708 A1 | 10/2014 | Green et al. |
| 2016/0099628 A1 | 4/2016 | Ried et al. |
| 2017/0190435 A1 | 7/2017 | Kobayashi et al. |
| 2017/0203839 A1 | 7/2017 | Giannini et al. |
| 2017/0217600 A1 | 8/2017 | Regev et al. |
| 2018/0050811 A1 | 2/2018 | Niergarth et al. |
| 2018/0057157 A1 | 3/2018 | Groninga et al. |
| 2018/0251226 A1 | 9/2018 | Fenny et al. |
| 2018/0257761 A1 | 9/2018 | Oldroyd et al. |
| 2018/0362160 A1 | 12/2018 | Groninga et al. |
| 2019/0031336 A1 | 1/2019 | Mccullough et al. |
| 2019/0144126 A1 | 5/2019 | Groninga et al. |
| 2019/0193835 A1 | 6/2019 | Sandberg et al. |
| 2019/0270516 A1 | 9/2019 | Sinusas et al. |
| 2019/0288571 A1 | 9/2019 | Lehikoinen et al. |
| 2019/0329859 A1 | 10/2019 | Bevirt et al. |
| 2019/0389570 A1 | 12/2019 | Lauder |
| 2021/0039796 A1 | 2/2021 | Hirabayashi et al. |

FOREIGN PATENT DOCUMENTS

| | | |
|---|---|---|
| EP | 3424819 A1 | 1/2019 |
| EP | 3738887 A1 | 11/2020 |
| GB | 1322169 A | 7/1973 |
| TW | 201203794 A | 1/2012 |
| WO | 2010123601 A1 | 10/2010 |

ELECTRIC TILTROTOR AIRCRAFT WITH TILTING COAXIAL MOTORS AND GEARBOX

CROSS-REFERENCE TO RELATED APPLICATION(S)

This application claims the benefit of and hereby incorporates by reference, for all purposes, the entirety of the contents of U.S. Nonprovisional application Ser. No. 17/148,307 filed Jan. 13, 2021, and entitled, "ELECTRIC TILTROTOR AIRCRAFT WITH TILTING COAXIAL MOTORS AND GEARBOX".

TECHNICAL FIELD

This disclosure relates in general to the field of tiltrotor aircraft and, more particularly, though not exclusively, to an electric tiltrotor aircraft with tilting coaxial motors and gearbox.

BACKGROUND

An electric vertical takeoff and landing (eVTOL) is a type of aircraft that uses electric power to supply rotational energy in an aircraft propulsion system for enabling the aircraft to hover, take off, and land vertically. Because of their versatility and lack of a need for a runway, eVTOLs are particularly useful for providing urban air mobility. As used herein, the term eVTOL also includes VTOLs that use hybrid electric propulsion systems. One particular type of eVTOL is an electric tiltrotor aircraft.

SUMMARY

One embodiment is a rotor system for an aircraft, the rotor system comprising an open rotor assembly comprising a plurality of rotor blades connected to a rotor mast via a yoke, wherein the rotor assembly is tiltable relative to a wing of the aircraft between a first position corresponding to an airplane mode of the aircraft and a second position corresponding to a helicopter mode of the aircraft; and a drive system for providing rotational energy to the open rotor assembly via the rotor mast. The drive system includes at least one electric motor for providing rotational energy to a drive shaft and a gearbox connected to the drive shaft for receiving rotational energy from the at least one electric motor via the drive shaft and providing rotational energy to the rotor mast via a rotor shaft. The drive system is rotatable relative to the wing about a tilt axis and the rotor shaft is coaxial with the drive shaft.

Another embodiment is an aircraft comprising a rotor system, the rotor system comprising an open rotor assembly comprising a plurality of rotor blades connected to a rotor mast via a yoke, wherein the rotor assembly is tiltable relative to a wing of the aircraft between a first position corresponding to an airplane mode of the aircraft and a second position corresponding to a helicopter mode of the aircraft and a drive system for providing rotational energy to the open rotor assembly via the rotor mast. The drive system includes at least one electric motor for providing rotational energy to a drive shaft and a gearbox connected to the drive shaft for receiving rotational energy from the at least one electric motor via the drive shaft and providing rotational energy to the rotor mast via a rotor shaft. The drive system is rotatable relative to the wing about a tilt axis and the rotor shaft is coaxial with the drive shaft.

Yet another embodiment is a drive system for providing rotational energy to an open rotor assembly of a rotor craft, the drive system comprising at least one electric motor for providing rotational energy to a drive shaft and a gearbox connected to the drive shaft for receiving rotational energy from the at least one electric motor via the drive shaft and providing rotational energy to the rotor mast via a rotor shaft. The drive system is rotatable relative to the wing about a tilt axis and the rotor shaft is coaxial with the drive shaft.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Described herein is a drive system for an electric tiltrotor aircraft. In accordance with features of embodiments described herein, the drive system includes one or more tilting electric motors coupled to an off-axis tilting gearbox. Tilting of the motors and gearbox occurs with reference to a wing or other stationary structure of the aircraft.

Figure 1A:
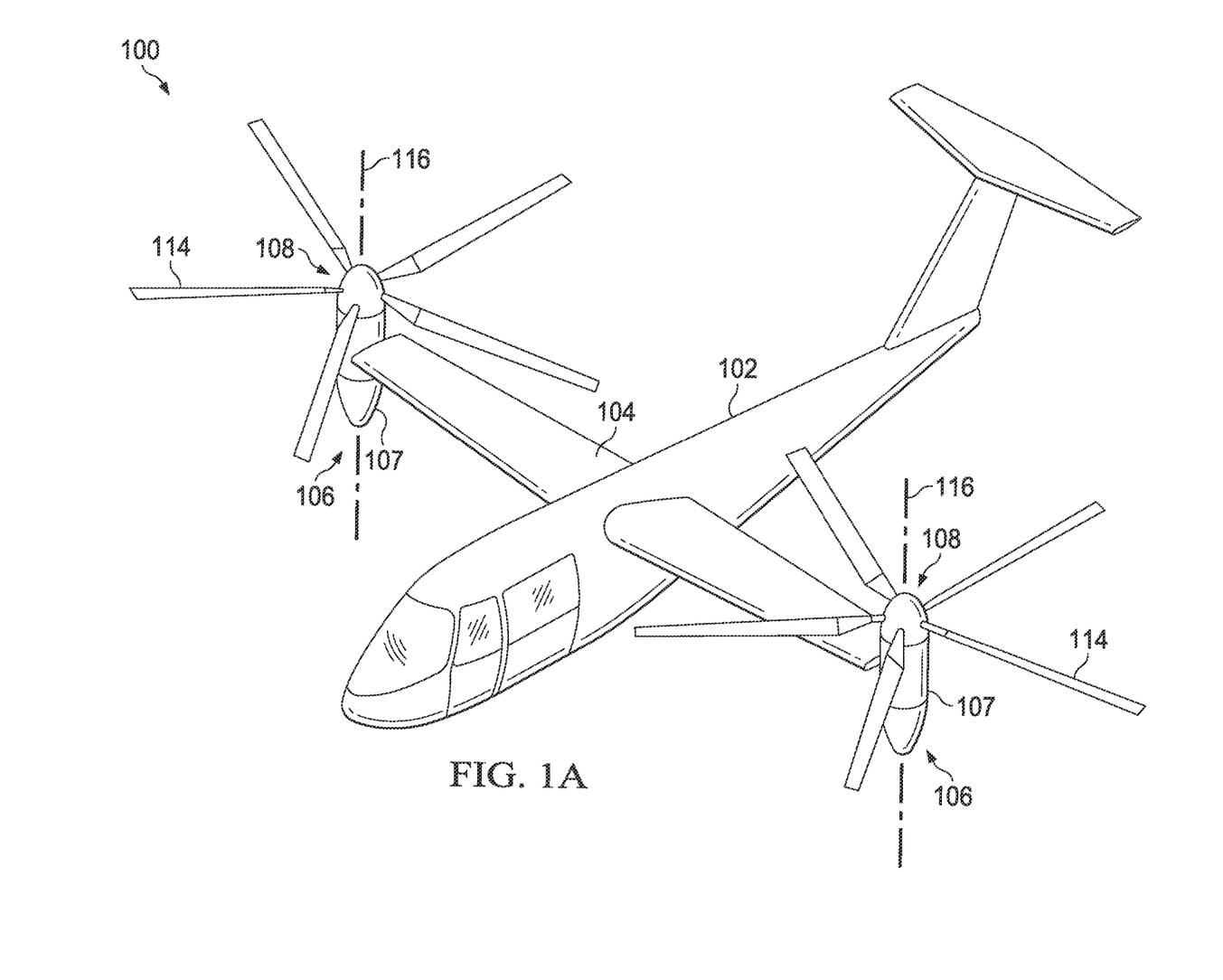
FIGS. 1A-1B illustrate an electric tiltrotor aircraft with tilting coaxial motors and gearbox in accordance with embodiments described herein.
Figure 1B:
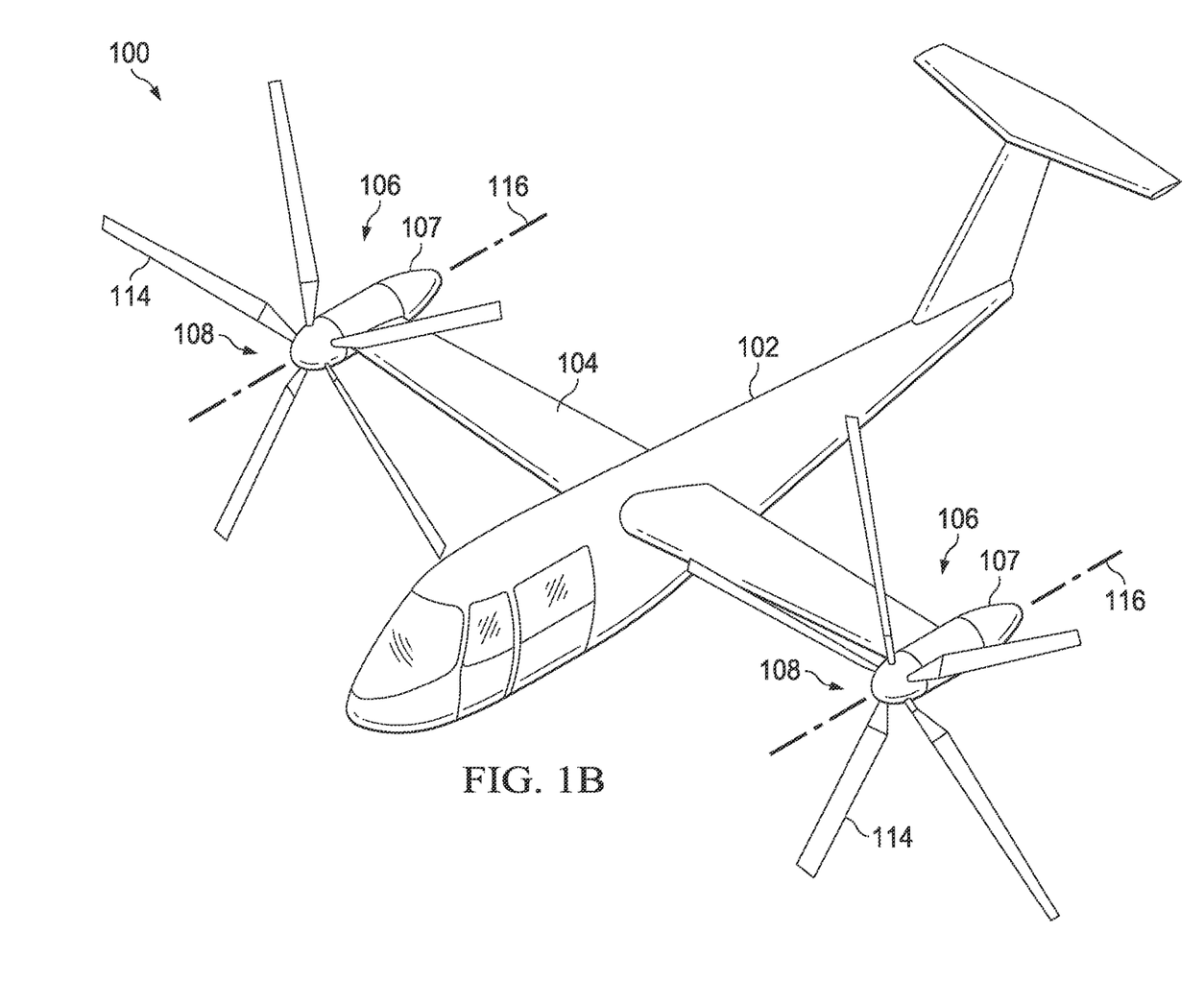

FIGS. 1A and 1B illustrate an example electric tiltrotor aircraft 100 that is convertible between a helicopter mode (shown in FIG. 1A), which allows for vertical takeoff and landing, hovering, and low speed directional movement, and an airplane mode (shown in FIG. 1B), which allows for forward flight as well as horizontal takeoff and landing. Aircraft 100 includes a fuselage 102, wing 104, and a propulsion assemblies 106 rotatably coupled to wing 104 on opposite sides of the fuselage 102. Each propulsion assembly 106 includes a nacelle or pylon 107 and an open rotor assembly 108 including a plurality of rotor blades 114 connected to a rotor mast (FIG. 2) and configured to rotate about a rotor axis 116. Rotation of rotor blades 114 about rotor axis 116 generates lift while operating in helicopter mode and thrust while operating in airplane mode. Each pylon 107 may house one or more electric motors therein configured to produce rotational energy that drives the rotation of rotor assembly 108. Alternatively, each pylon 107 may house a gearbox therein that drives the rotation of rotor assembly 108, wherein the gearbox receives rotational energy from a drive shaft.

The position of rotor assemblies 108, as well as the pitch of individual rotor blades 114, can be selectively controlled in order to selectively control direction, thrust, and lift of aircraft 100. Propulsion assemblies 106 are each convertible, relative to fuselage 102, between a vertical position, as shown in FIG. 1A, and a horizontal position, as shown in FIG. 1B. Propulsion assemblies 106 are in the vertical position during vertical takeoff and landing mode. Vertical takeoff and landing mode may be considered to include hover operations of aircraft 100. Propulsion assemblies 106 are in the horizontal position during forward flight mode, in which aircraft 100 is in forward flight. In forward flight mode, propulsion assemblies 106 direct their respective thrusts in the aft direction to propel aircraft 100 forward. Aircraft 100 is operable to fly in all directions during the vertical takeoff and landing mode configuration of FIG. 1A, although faster forward flight is achievable while in the forward flight mode configuration of FIG. 1B. Propulsion assemblies 106 may be tiltable between the vertical and horizontal positions by a rotatable shafts (not shown) extending through wing 104 on opposite sides of fuselage 102 that are rotatable in response to commands originating from a pilot and/or a flight control system. Each of the propulsion assemblies 106 utilizes an electric motor and gearbox unit (described below) disposed within a respective rotatable pylon 107 as a power source to rotate the respective rotor assembly 108 about rotor axis via a rotor mast.

Propulsion assemblies 106 are illustrated in the context of aircraft 100; however, propulsion assemblies 106 may be implemented on other types of tiltrotor aircraft. For example, an alternative embodiment may include a quad tiltrotor that has an additional wing member aft of wing 104 that can have additional propulsion assemblies similar to propulsion assemblies 106. In another embodiment, propulsion assemblies 106 may be implemented in connection with an unmanned version of aircraft 100. Further, propulsion assemblies 106 may be integrated into a variety of tiltrotor aircraft configurations.

Figure 2A:
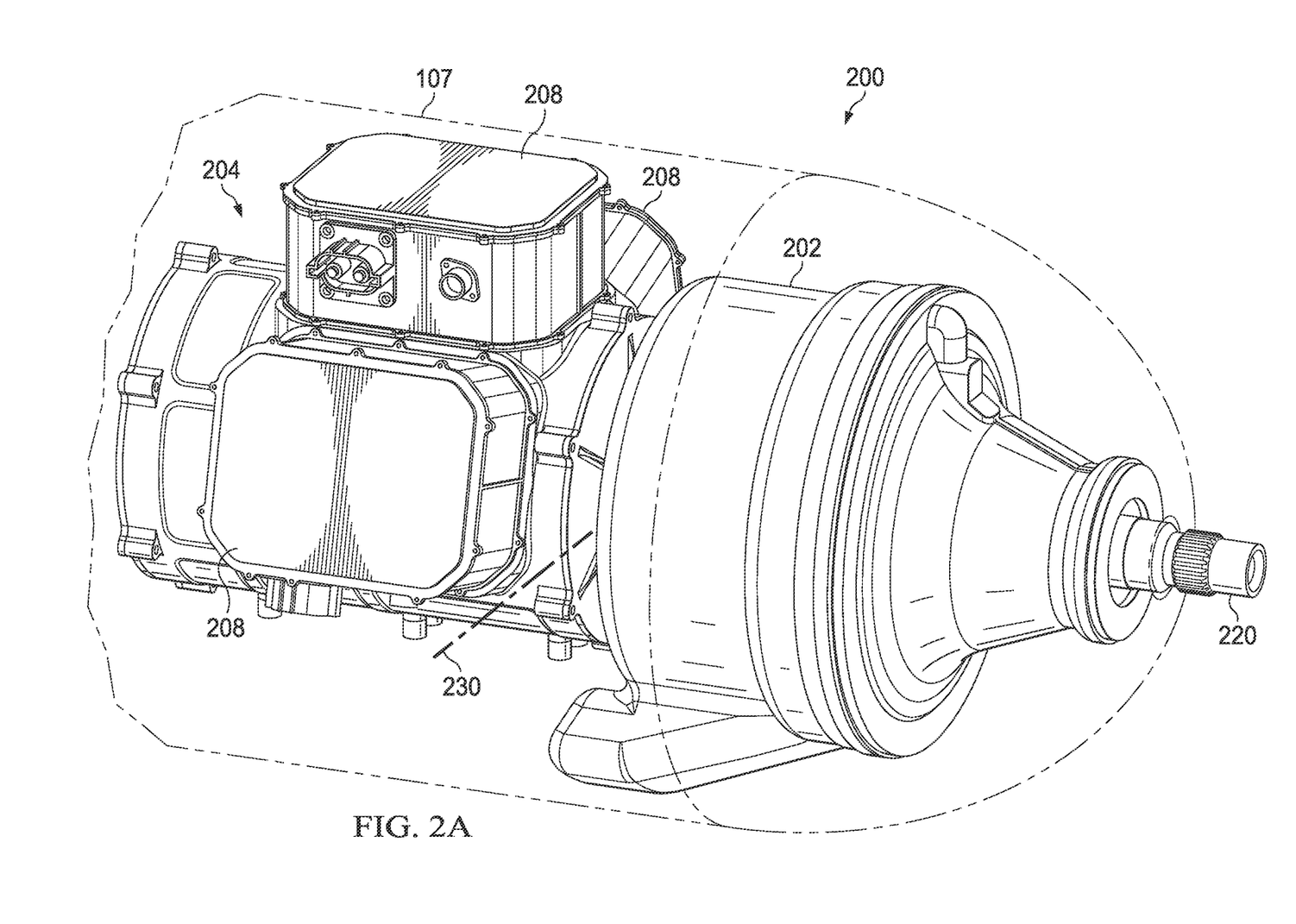
FIGS. 2A and 2B illustrate features of an example arrangement of a rotor propulsion system of the aircraft shown in FIGS. 1A-1B.
Figure 2B:
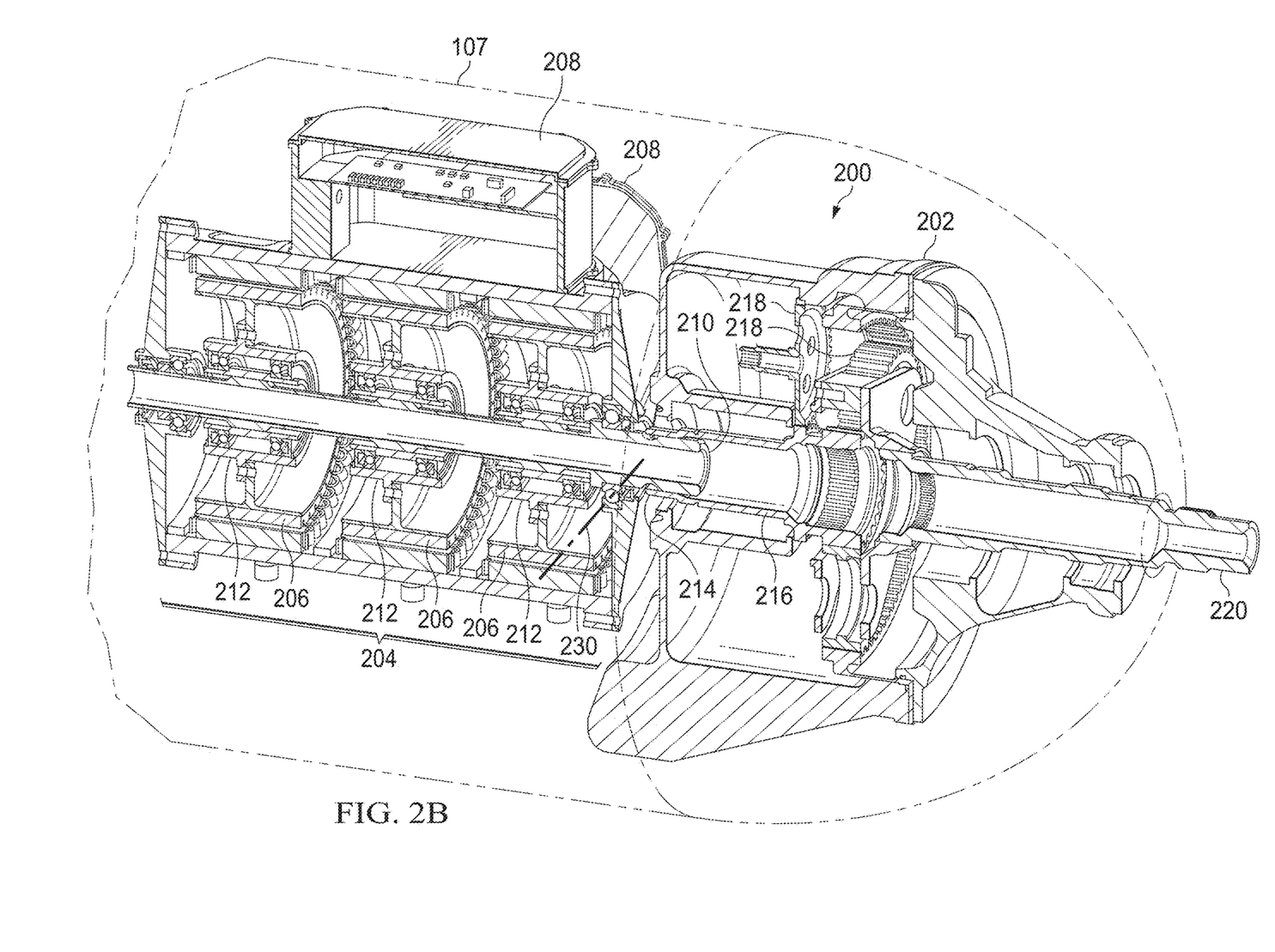

As shown in FIGS. 2A and 2B, and as will be described in detail below, each of the propulsion assemblies 106 includes a drive system 200 disposed within the pylon 107 for use as a power source for rotating the rotor system 108 about the rotor axis 116.

As shown in FIGS. 2A and 2B, the drive system 200 includes a gear box 202 and a motor portion 204 containing one or more electric motors 206 and associated power electronics 208. In certain embodiments, electric motors 206 may be implemented as radial flux motors.

As best shown in FIG. 2B, the motors 206 collectively drive (i.e., provide rotational power to) a drive shaft 210. Each of the motors 206 may be connected to the drive shaft 210 via a respective one of overrunning clutches 212, each of which transmits torque in one direction only and permits the drive shaft 210 to "freewheel," or continue to rotate, when the respective one of the motors 206 is stopped (e.g., upon failure of the motor). As will be described in greater detail hereinbelow, a forward end of drive shaft 210 is received within a receptacle 214 of the gearbox 202 for providing rotational power to a second drive shaft 216 disposed within gearbox 202 for driving gearbox gears 218. Gearbox gears 218 operate to transfer torque to a rotor shaft 220 connected to rotor assembly 108 (FIGS. 1A and 1B) for driving rotor assembly about rotor axis 116 (FIGS. 1A and 1B). It will be noted that, although drive system 200 is illustrated as including three electric motors, more or fewer motors may be included without departing from the spirit or scope of embodiments described herein.

Figure 2C:
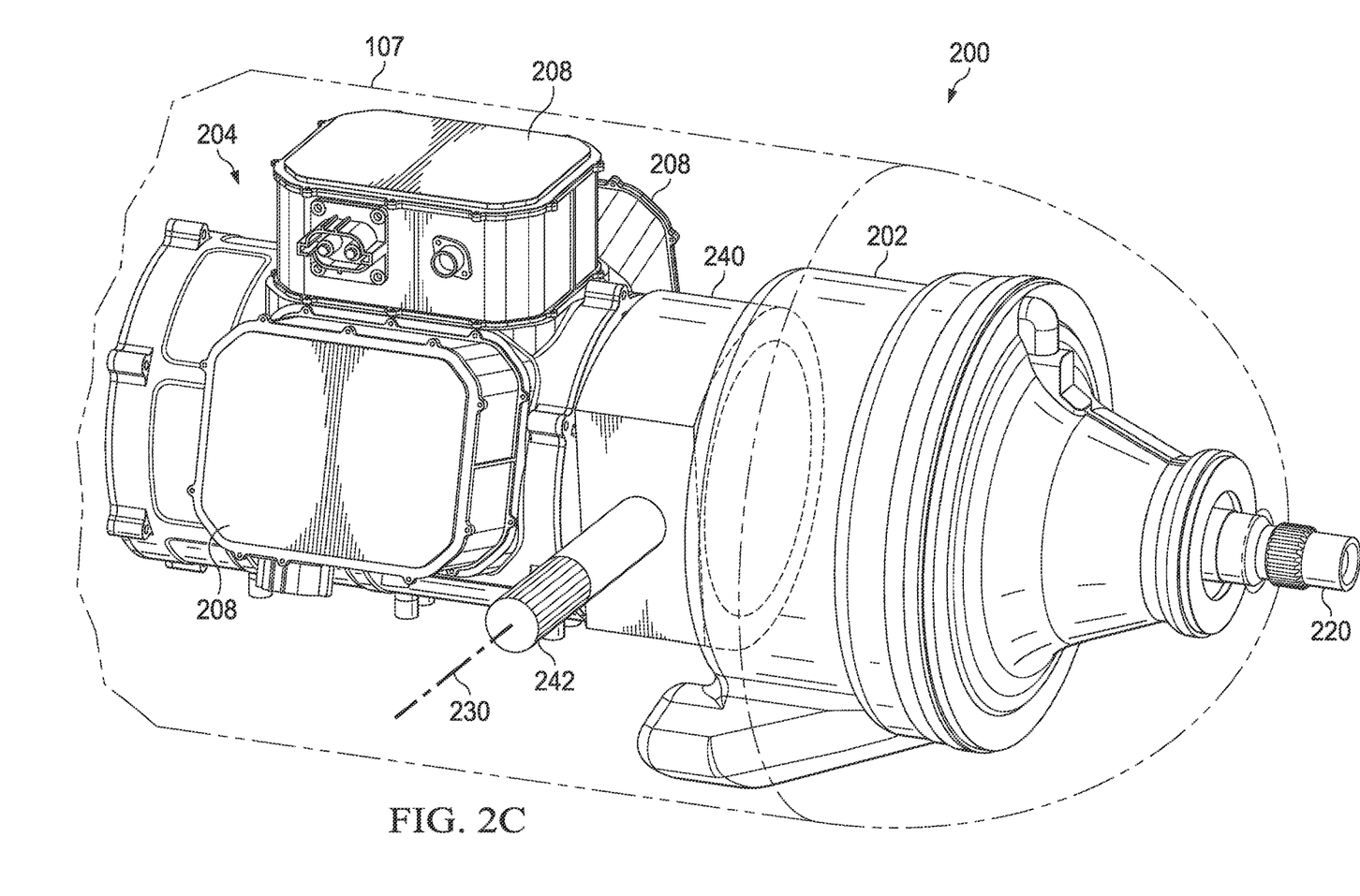
FIG. 2C illustrates features of an alternative arrangement of a rotor propulsion system of the aircraft shown in FIGS. 1A-1B.

In certain embodiments, gearbox 202 is directly driven by motors 206. In alternative embodiments, as illustrated in FIG. 2C, an adapter 240 may be provided between motors 206 and gearbox 202 for facilitating maintenance. Specifically, adapter 240 enables motor assembly 206 and/or gearbox 202 to be removed (e.g., for maintenance) without requiring disassembly of all the major components from the nacelle. In certain embodiments, the adapter 240 is a structural component that may include a conversion spindle 240. As shown in FIG. 2C, the adapter 240 is positioned between or next to the gearbox 202 and motor assembly 206 and includes interfaces to attach to each separately. A shaft may span across the adapter to transmit the torque between the motor assembly and the gearbox; alternatively, the drive shaft could plug directly into the gearbox 202 through the adapter 240. The adapter may be configured in a variety of manners but in general comprises a structural member that supports multiple systems such that any one of them can be removed without substantially affecting the others. As shown in FIG. 2C, a spindle 242 may be integral to the adapter 240. Alternatively, spindle 242 may be attached to adapter 240 with a flange or other type of joint. As shown in FIG. 2C, gearbox 202 attaches to one side of the adapter 240 and the motors 206 attach to the opposite side of the adapter.

As shown in FIGS. 2A and 2B, pylon 107, including the entire drive system 200, rotates relative to the wing 104 or other stationary structure about a tilt axis 230, which in the illustrated embodiment is located between electric motors 206 and gearbox 202, between a vertical position (e.g., as shown in FIG. 1A) and a horizontal position (e.g., as shown in FIG. 1B). In accordance with features of embodiments described herein. As shown in FIGS. 2A and 2B, motors 206 and gearbox 202 are coaxial.

Figure 3:
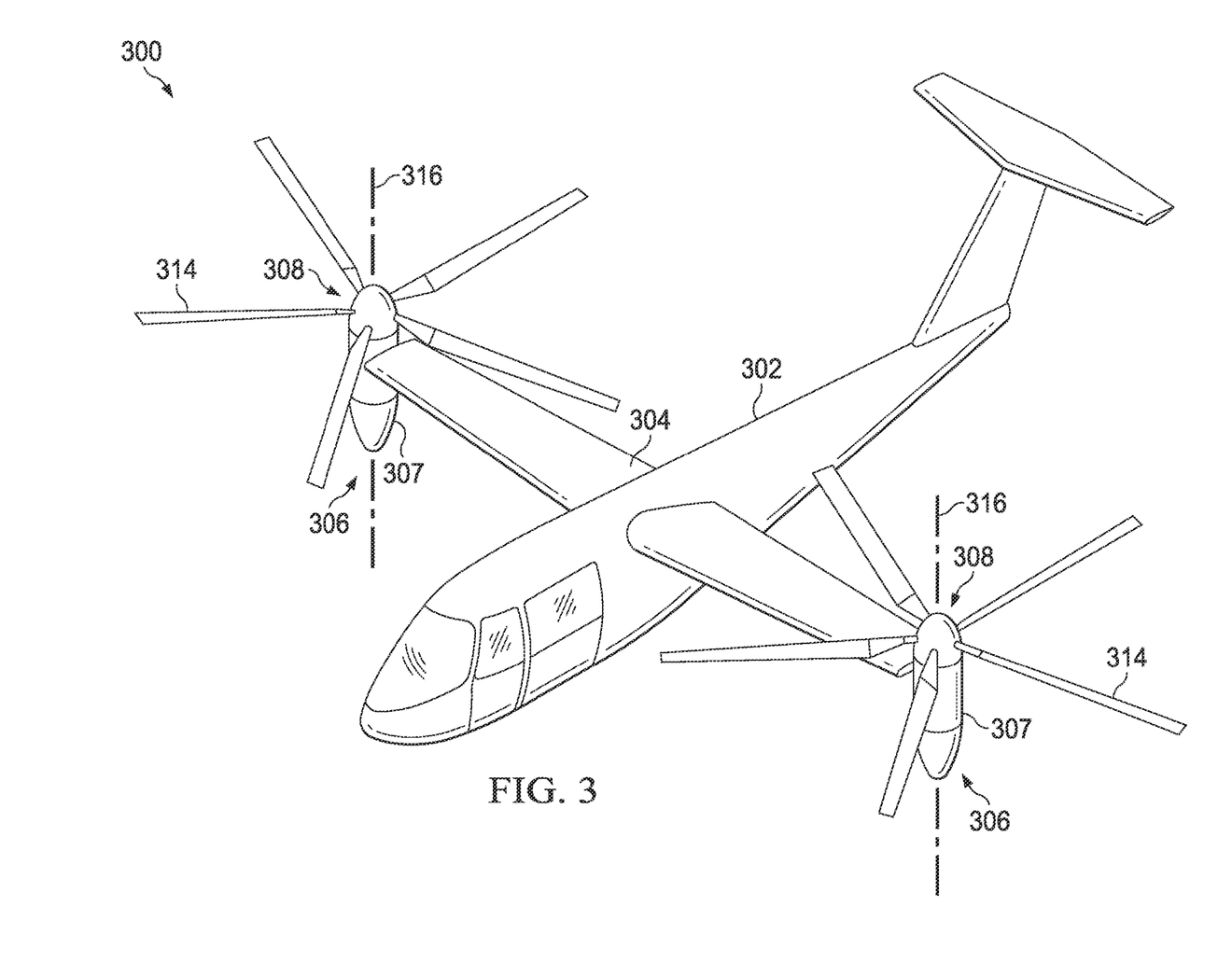
FIG. 3 illustrates an electric tiltrotor aircraft with tilting coaxial motors and gearbox in accordance with an alternative embodiment described herein.
Figure 4:
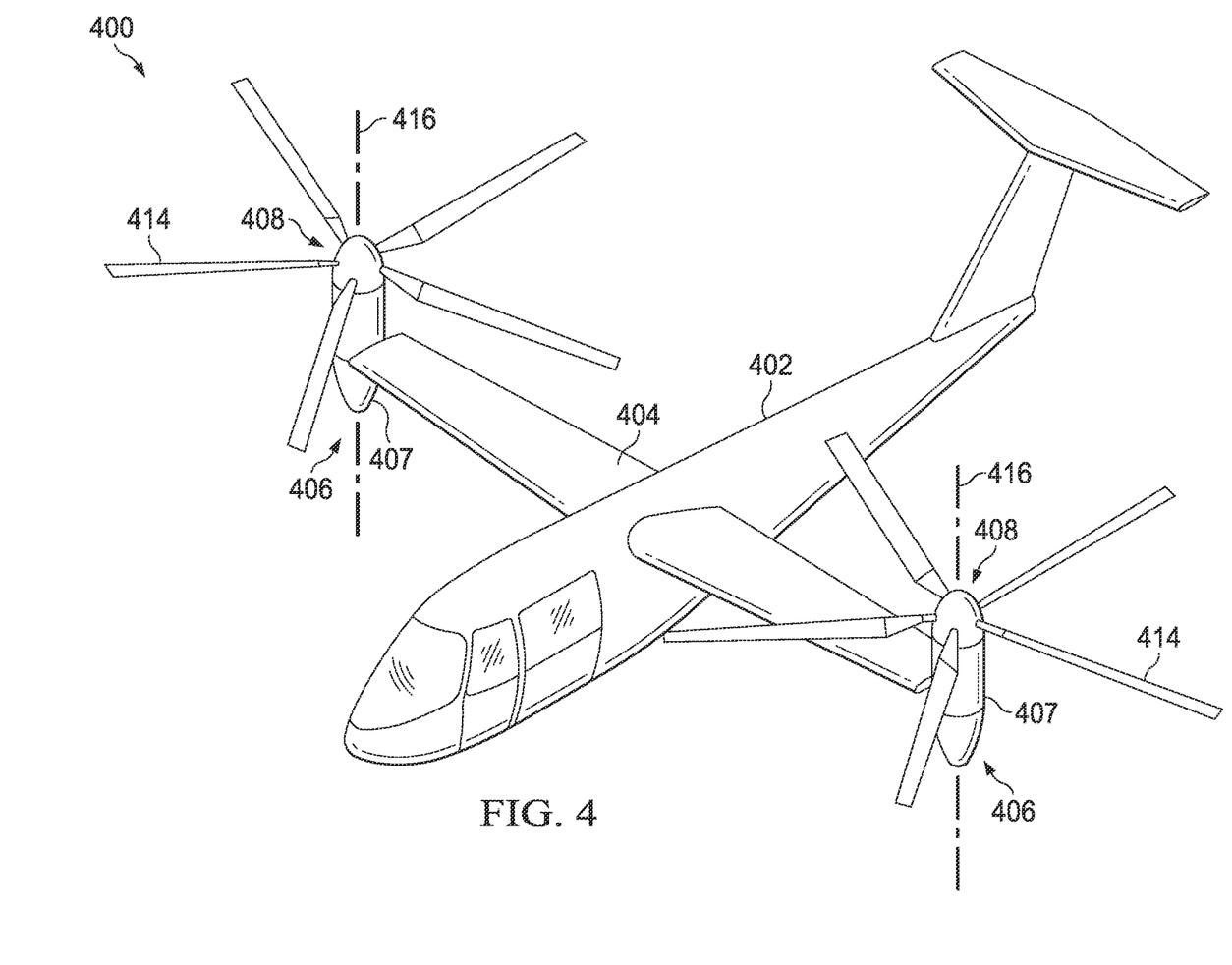
FIG. 4 illustrates an electric tiltrotor aircraft with tilting coaxial motors and gearbox in accordance with another alternative embodiment described herein.

It will be recognized that other tilt axes may be defined based on various considerations, such as rotor assembly clearance requirements relative to stationary structures of aircraft 100. FIG. 3 illustrates an embodiment of aircraft 100' in which the tilt axis is located closer to the top/forward end of pylons 107'. FIG. 4 illustrates an embodiment of aircraft 100" in which the tilt axis is located closer to the bottom/aft end of pylons 107".

The configuration of propulsion system 106 as illustrated herein provides flexibility in arrangement of electric motors 202. For example, motors 202 may be configured as cylinders in series, stacked pancakes, or a flat pack.

Figure 5A:
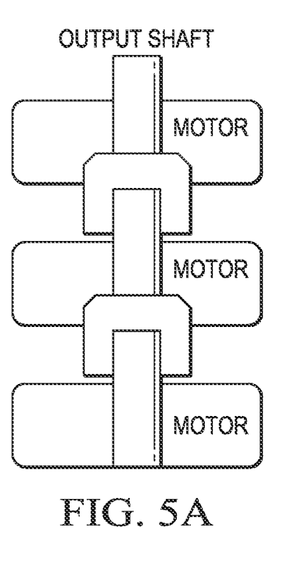
FIGS. 5A-5C illustrate example electric motor configurations for use in the rotor propulsion system shown in FIG. 2.
Figure 5B:
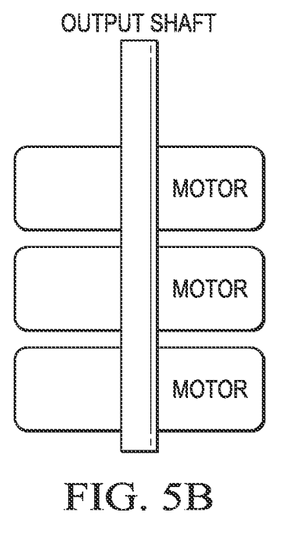
Figure 5C:
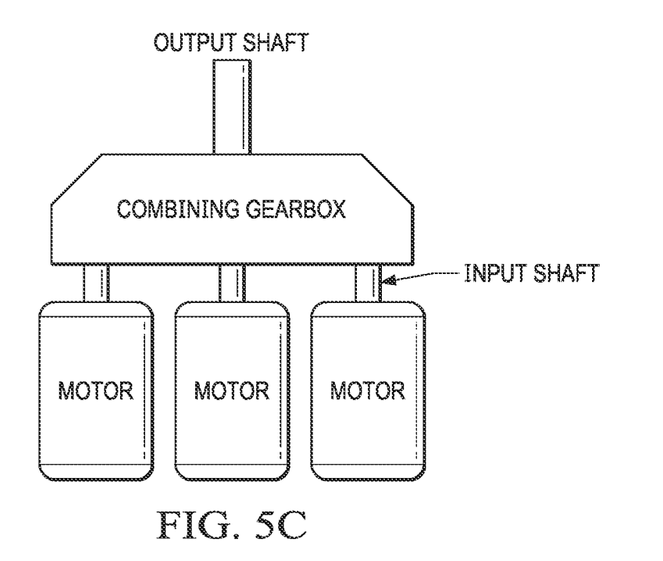

Referring now to FIGS. 5A-5C, as indicated above, motors may be configured as cylinders in series (FIG. 5A) stacked pancakes (FIG. 5B), or a flat pack (FIG. 5C). Referring first to FIG. 5A, in the series arrangement, motors are stacked in line with the output shaft of the first motor in the series engaging the input shaft of the next motor in the series. The shafts may be engaged with one another by way of splines or another appropriate method. Referring to FIG. 5B, in a pancake arrangement, multiple motors are stacked and engage a single output shaft. Motors can utilize different methods of engaging the output shaft, such as splines, bolted flanges, or other means. Finally, referring to FIG. 5C, in a flat pack arrangement, a combining gearbox is provided to combine inputs from the motors to a single output shaft.

It should be appreciated that aircraft illustrated herein, such as aircraft 100, is merely illustrative of a variety of aircraft that can implement the embodiments disclosed herein. Indeed, the various embodiments of the electric drive system line replaceable unit described herein may be used on any aircraft that utilizes motors. Other aircraft implementations can include hybrid aircraft, tiltrotor aircraft, quad tiltrotor aircraft, unmanned aircraft, gyrocopters, airplanes, helicopters, commuter aircraft, electric aircraft, hybrid-electric aircraft, and the like. As such, those skilled in the art will recognize that the embodiments described herein for an electric drive system line replaceable unit can be integrated into a variety of aircraft configurations. It should be appreciated that even though aircraft are particularly well-suited to implement the embodiments of the present disclosure, non-aircraft vehicles and devices can also implement the embodiments.

The components of rotor assemblies 108 may comprise any materials suitable for use with an aircraft rotor. For example, rotor blades 114 and other components may comprise carbon fiber or aluminum; and rotor masts 222 and other components may comprise steel or titanium. While rotor assemblies 108 are shown with five rotor blades 114, respectively, it should be understood that they may have as few as two rotor blades and may have more than five rotor blades, Still further, while only two rotor assemblies 108 are depicted, it will be recognized that embodiments described herein may be implemented in connection with any number of rotor assemblies.

Example 1 is a rotor system for an aircraft, the rotor system comprising an open rotor assembly comprising a plurality of rotor blades connected to a rotor mast via a yoke, wherein the rotor assembly is tiltable relative to a wing of the aircraft between a first position corresponding to an airplane mode of the aircraft and a second position corresponding to a helicopter mode of the aircraft; and a drive system for providing rotational energy to the open rotor assembly via the rotor mast, the drive system comprising at least one electric motor for providing rotational energy to a drive shaft; and a gearbox connected to the drive shaft for receiving rotational energy from the at least one electric motor via the drive shaft and providing rotational energy to the rotor mast via a rotor shaft; wherein the drive system is rotatable relative to the wing about a tilt axis; and wherein the rotor shaft is coaxial with the drive shaft.

In Example 2, the rotor system of Example 1 may further include the tilt axis being located forward of the at least one motor and aft of the gear box.

In Example 3, the rotor system of any of Examples 1-2 may further include the tilt axis being located closer to a forward end of the drive system than to an aft end of the drive system.

In Example 4, the rotor system of any of Examples 1-3 may further include the tilt axis being located closer to an aft end of the drive system than to a forward end of the drive system.

In Example 5, the rotor system of any of Examples 1-4 may further include the at least one electric motor comprising a plurality of electric motors arranged as cylinders in series, wherein an output of a first one of the plurality of electric motors engages with an input of a next one of the plurality of electric motors.

In Example 6, the rotor system of any of Examples 1-5 may further include the at least one electric motor comprising a plurality of electric motors arranged as stacked pancakes, wherein all of the plurality of electric motors engage with a single drive shaft.

In Example 7, the rotor system of any of Examples 1-6 may further include the at least one electric motor comprising a plurality of electric motors arranged as a flat pack, wherein outputs of the plurality of electric motors engage with inputs of a combining gearbox for driving a driveshaft.

In Example 8, the rotor system of any of Examples 1-7 may further include a nacelle in which the drive system is housed, wherein the nacelle is rotatably connected to the wing of the aircraft at the tilt axis.

In Example 9, the rotor system of any of Examples 1-8 may further include the at least one motor being connected to the drive shaft via an overrunning clutch.

In Example 10, the rotor system of any of Examples 1-9 may further include an adapter having a first interface connected to the at least one motor and a second interface connected to the at least one gear box.

Example 11 is an aircraft comprising a rotor system, the rotor system comprising an open rotor assembly comprising a plurality of rotor blades connected to a rotor mast via a yoke, wherein the rotor assembly is tiltable relative to a wing of the aircraft between a first position corresponding to an airplane mode of the aircraft and a second position corresponding to a helicopter mode of the aircraft; and a drive system for providing rotational energy to the open rotor assembly via the rotor mast, the drive system comprising at least one electric motor for providing rotational energy to a drive shaft; and a gearbox connected to the drive shaft for receiving rotational energy from the at least one electric motor via the drive shaft and providing rotational energy to the rotor mast via a rotor shaft; wherein the drive system is rotatable relative to the wing about a tilt axis; and wherein the rotor shaft is coaxial with the drive shaft.

In Example 12, the aircraft of Example 11 may further include the tilt axis being located forward of the at least one motor and aft of the gear box.

In Example 13, the aircraft of any of Example 11-12 may further include the tilt axis being located closer to a forward end of the drive system than to an aft end of the drive system.

In Example 14, the aircraft of any of Examples 11-13 may further include the tilt axis being located closer to an aft end of the drive system than to a forward end of the drive system.

In Example 15, the aircraft of any of Examples 11-14 may further include a nacelle in which the drive system is housed, wherein the nacelle is rotatably connected to the wing of the aircraft at the tilt axis.

In Example 16, the aircraft of any of Examples 11-15 may further include the at least one motor being connected to the drive shaft via an overrunning clutch.

In Example 17, the aircraft of any of Examples 11-16 may further include an adapter having a first interface connected to the at least one motor and a second interface connected to the at least one gear box.

Example 18 is a drive system for providing rotational energy to an open rotor assembly of a rotor craft, the drive system comprising at least one electric motor for providing rotational energy to a drive shaft; and a gearbox connected to the drive shaft for receiving rotational energy from the at least one electric motor via the drive shaft and providing rotational energy to the rotor mast via a rotor shaft; wherein the drive system is rotatable relative to the wing about a tilt axis; and wherein the rotor shaft is coaxial with the drive shaft.

In Example 19, the drive system of Example 18 may further include the tilt axis being located forward of the at least one motor and aft of the gear box.

In Example 20, the drive system of any of Examples 18-19 may further include the tilt axis being located at least one of closer to a forward end of the drive system than to an aft end of the drive system and closer to an aft end of the drive system than to a forward end of the drive system.

At least one embodiment is disclosed, and variations, combinations, and/or modifications of the embodiments) and/or features of the embodiment(s) made by a person having ordinary skill in the art are within the scope of the disclosure. Alternative embodiments that result from combining, integrating, and/or omitting features of the embodiments) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, RI, and an upper limit, Ru, is disclosed, any number falling within the range is specifically disclosed. In particular, the following numbers within the range are specifically disclosed: R=RI+k*(Ru−RI), wherein k is a variable ranging from 1 percent to 100 percent with a 1 percent increment, i.e., k is 1 percent, 2 percent, 3 percent, 4 percent, 5 percent . . . 50 percent, 51 percent, 52 percent . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiments) of the present invention. Also, the phrases "at least one of A, B, and C" and "A and/or B and/or C" should each be interpreted to include only A, only B, only C, or any combination of A, B, and C.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A rotor system for an aircraft, the rotor system comprising:
   a rotor assembly comprising a plurality of rotor blades connected to a rotor mast; and
   a drive system for providing rotational energy to the rotor assembly via the rotor mast, the drive system comprising:
      a first section comprising at least one electric motor for providing rotational energy to a drive shaft;
      second section connected to the drive shaft for receiving rotational energy from the at least one electric motor via the drive shaft and providing rotational energy to the rotor mast via a rotor shaft; and
      an adapter comprising a first interface connected to an end of the first section and a second interface connected to an end of the second section, the adapter further comprising a conversion spindle projecting from a side thereof between the first and second interface;
   wherein the drive system is configured to rotate about a tilt axis defined by the conversion spindle.

2. The rotor system of claim 1, wherein the at least one electric motor comprises a plurality of electric motors arranged as cylinders in series, wherein an output of a first one of the plurality of electric motors engages with an input of a next one of the plurality of electric motors.

3. The rotor system of claim 1, wherein the at least one electric motor comprises a plurality of electric motors arranged as stacked pancakes, wherein all of the plurality of electric motors engage with a single drive shaft.

4. The rotor system of claim 1, wherein the at least one electric motor comprises a plurality of electric motors arranged as a flat pack, wherein outputs of the plurality of electric motors engage with inputs of a combining gearbox for driving a driveshaft.

5. The rotor system of claim 1 further comprising a nacelle in which the drive system is housed, wherein the nacelle comprises a forward end and an aft end.

6. The rotor system of claim 1, wherein the at least one electric motor is connected to the drive shaft via an overrunning clutch.

7. The rotor system of claim 5, wherein the tilt axis is located closer to the forward end of the nacelle than to the aft end of the nacelle.

8. The rotor system of claim 5, wherein the tilt axis is located closer to the aft end of the nacelle than to the forward end of the nacelle.

9. An aircraft comprising a rotor system, the rotor system comprising:
   a rotor assembly comprising a plurality of rotor blades connected to a rotor mast, wherein the rotor assembly is tiltable relative to a wing of the aircraft between a first position corresponding to an airplane mode of the aircraft and a second position corresponding to a helicopter mode of the aircraft; and
   a drive system for providing rotational energy to the rotor assembly via the rotor mast, the drive system comprising:
      a first section including at least one electric motor for providing rotational energy to a drive shaft;
      a second section connected to the drive shaft for receiving rotational energy from the at least one electric motor via the drive shaft and providing rotational energy to the rotor mast via a rotor shaft; and
      an adapter disposed between the first and second sections;
   wherein the drive system is tiltable relative to the wing about a tilt axis located on the adapter between the electric motor and the second.

10. The aircraft of claim 9, wherein the rotor shaft is coaxial with the drive shaft.

11. The aircraft of claim 9, further comprising a nacelle in which the drive system is housed, wherein the nacelle is tiltably connected to the wing of the aircraft at the tilt axis.

12. The aircraft of claim 9, wherein the motor is connected to the drive shaft via an overrunning clutch.

13. The aircraft of claim 9, wherein the at least one electric motor comprises a plurality of electric motors arranged as cylinders in series, wherein an output of a first one of the plurality of electric motors engages with an input of a next one of the plurality of electric motors.

14. The aircraft of claim 9, wherein the at least one electric motor comprises a plurality of electric motors arranged as stacked pancakes, wherein all of the plurality of electric motors engage with a single drive shaft.

15. The aircraft of claim 9, wherein the at least one electric motor comprises a plurality of electric motors arranged as a flat pack, wherein outputs of the plurality of electric motors engage with inputs of a combining gearbox for driving a driveshaft.

16. A drive system for providing rotational energy to a rotor assembly of a rotor craft, the drive system comprising:
- a first section comprising at least one electric motor for providing rotational energy to a drive shaft;
- a second section connected to the drive shaft for receiving rotational energy from the electric motor via the drive shaft and providing rotational energy to a rotor shaft; and
- an adapter comprising a first interface connected to an end of the first section and a second interface connected to an end of the second section, the adapter further comprising a conversion spindle projecting from a side thereof between the first and second interface;
- wherein the drive system is configured to rotate about a tilt axis defined by the conversion spindle; and
- wherein the rotor shaft is coaxial with the drive shaft.

* * * * *